United States Patent [19]
Egami

[11] Patent Number: 4,727,118
[45] Date of Patent: Feb. 23, 1988

[54] POLYETHER IMIDE RESIN COMPOSITION CONTAINING VULCANIZABLE ORGANOPOLYSILOXANE

[75] Inventor: Masaki Egami, Yokkaichi, Japan

[73] Assignee: NTN-Rulon Industries Co., Ltd., Tokyo, Japan

[21] Appl. No.: 770,932

[22] Filed: Aug. 30, 1985

[30] Foreign Application Priority Data

Apr. 12, 1985 [JP] Japan .................................. 60-78700

[51] Int. Cl.[4] .................. C08L 79/08; C08L 71/00; C08L 77/00; C08L 83/00
[52] U.S. Cl. .................................. 525/431; 522/111; 522/134
[58] Field of Search .................................. 525/431

[56] References Cited

U.S. PATENT DOCUMENTS

| | | | |
|---|---|---|---|
| 3,781,237 | 12/1973 | Alvino et al. | 525/431 |
| 4,387,193 | 6/1983 | Giles | 525/431 |
| 4,517,342 | 5/1985 | Ryang | 525/431 |

FOREIGN PATENT DOCUMENTS

0113251  7/1983  Japan .................................. 525/431

*Primary Examiner*—Wilbert J. Briggs, Sr.
*Attorney, Agent, or Firm*—Armstrong, Nikaido, Marmelstein & Kubovcik

[57] ABSTRACT

A polyether imide resin composition is proposed which has improved ductility and is less harmful to mating parts during sliding and thus can be used as the material for parts requiring rub resistance and abrasion resistance. It comprises 50–99.5 percent by weight of a polyether imide and 50–0.5 percent by weight of a vulcanizable organopolysiloxane elastomer.

5 Claims, No Drawings

POLYETHER IMIDE RESIN COMPOSITION CONTAINING VULCANIZABLE ORGANOPOLYSILOXANE

BACKGROUND OF THE INVENTION

The present invention relates to polyether imide resin compositions having excellent impact and sliding characteristics.

Polyether imide resins have been drawing attention as an engineering plastic having excellent heat resistance, chemical resistance, fire retardance, electrical characteristics, rigidity, moldability, etc., and are expected to have a wide range of application in fields of electric and electronic parts, automobile parts and machine parts, etc. This resin, however, has shortcomings of poor ductility and thus high brittleness. It is well known to add fibrous reinforcing materials such as glass fiber to improve its brittleness to some degree. The improvement attainable by such a method was, however, not satisfactory. So it is strongly desired in various fields to improve its brittleness without sacrificing its desirable features such as heat resistance, fire retardance and rigidity.

Also, it has been proposed to use this resin as the material for sliding parts to make use of its high heat resistance. But, because this resin has poor self-lubricating property and poor abrasion resistance, it is not suited for this kind of use and might possibly damage the mating part on which it slides. This is a big problem. Although its friction coefficient and abrasion resistance can be improved by adding ethylene tetrafluoride resin, carbon fiber or the like, the addition does not lessen its harm against the mating part.

SUMMARY OF THE INVENTION

An object of the present invention is to provide a polyether imide resin composition which has improved ductility and is less harmful to mating parts during sliding and thus can be used as the material for parts requiring rub resistance and abrasion resistance.

In accordance with the present invention, 50 to 0.5 percent by weight of a vulcanizable organopolysiloxane elastomer is added to 50 to 99.5 percent by weight of a polyether imide.

It is presumed that the coexisting organopolysiloxane forms soft three-dimensional networks, which reinforce the structure of polyether imide and prevents the cracks due to shock from spreading and that the polyether imide phase divided by the network into small units plays an important role in lessening the harm or attack on the mating part during sliding.

The moldings made of the compositions according to the present invention maintain the high rigidity intrinsic to polyether imide, have excellent shock strength and do not damage the mating part during sliding. Therefore, the composition of the present invention is suited for use as the material for bearing parts because it meets all of the requirements for rigidity, shock strength and less harm to the mating part.

DETAILED DESCRIPTION OF THE PREFERRED EMBODIMENT

Polyether imide used in the present invention is a thermoplastic polymer having ether bonds and imide bonds as essential elements, such as the one sold by General Electric Inc. in U.S.A. under the name "Ultem", represented by the following chemical formula:

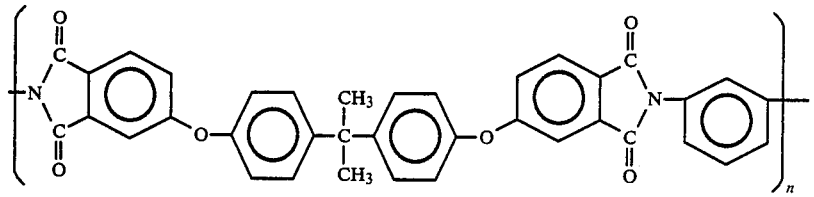

The method for manufacturing such a polyether imide is disclosed in e.g. Japanese patent publication 57-9372.

Vulcanizable organopolysiloxane elastomer used in the present invention is an elastomer having as a basic element a linear organopolysiloxane block represented by chemical formula:

$$-\!\!\operatorname{\{\!R_2SiO\!\}}_{\overline{n}} \qquad (II)$$

(wherein R is a monovalent organic group of the same or different kinds, or hydrogen), and prepared so that one end group of organopolysiloxane can cross-link three-dimensionally with R in the formula II or with its another end group. The vulcanizable organopolysiloxane elastomer may be ones vulcanized by the addition reaction in the presence of a platinum catalyst, ones vulcanized by condensation reaction (such as dehydration, dehydrogenation, dealcohol, deoxym, deamine, deamide, decarboxylic acid and deketone), ones vulcanized by organic peroxide under heating, or ones vulcanized by exposure to gamma, ultraviolet or electron rays. Generally such elastomers are on the market as room temperature curing silicone rubber, thermo-setting silicone rubber, liquid polymer system, etc. They are sold in the form of liquid or latex and the liquid ones are available in one-pack or two-pack type. Most of room temperature curing silicone rubbers contain a catalyst for vulcanization whereas thermosetting ones are used with some organic peroxide added during kneading or blending.

In accordance with present invention, 0.5 to 50 weight %, preferably 2 to 30 weight %, of vulcanizable organopolysiloxane elastomer should be added to polyether imide. If it is less than 0.5 weight %, brittleness and sliding characteristics would not be sufficiently improved. If more than 50 weight %, there would be a marked decrease in rigidity which is one of the features of polyether imide.

The components may be mixed in any known manner. For instance, a vulcanizable organopolysiloxane elastomer and polyether imide may be supplied separately into a hopper of an injection molder or a melt extruder having a good melt mixibility without mixing them beforehand. Or, if necessary, organopolysiloxane may be firstly dissolved in a suitable solvent and be mixed with polyether imide in a Henschel mixer, ball mill, tumbler mixer or the like. After removal of the solvent by vaporization, the mixture may either be fed directly to an injection molder or a melt extruder, or after melt mixing into pellets in hot rolls, a kneader, Banbury mixer or the like. The vulcanization of organopolysiloxane should preferably be done in the course of molding. Two kinds of organopolysiloxane elastomers may be separately melt mixed with polyether imide to make two kinds of pellets, which may be mixed before molding at a predetermined ratio and fed to an injection molder. In this case, two kinds of organopolysiloxane elastomers are melt mixed and vulcanized together during molding.

Although no particular limitation is meant regarding the method of molding the composition of the present invention, it may be molded by compression molding, extrusion molding or injection molding. Further, the composition of the present invention may be melt mixed and the mixture may be smashed by a jet mill or freeze smasher and the resulting powder may be used, either as it is or after classified to a desired particle size, for fluidization dip coating or electrostatic coating.

Various additives or fillers may be added within such a limit as not to interfere with the object of the present invention.

Given below are the materials used in the Examples and Control Examples. The percentages of content given are all in weight %.

(1) Polyether imide (made by General Electric, U.S.A.: "Ultem" 1000)
(2) 2-component type addition type room temperature curing silicone rubber (made by Toshiba Silicone Co.: RTV Silicone rubber TSE 3402A and 3402B)
(3) 2-component type condensation type room temperature curing silicone rubber (made by Toshiba Silicone Co.: RTV Silicone Rubber TSE 3562A and 3562B)
(4) 1-component type ultraviolet ray curing type room temperature curing silicone rubber (made by Toshiba Silicone Co.: RTV Silicone Rubber TUV 6000)
(5) Thermosetting silicone rubber (made by Toshiba Silicone Co.: RTV Silicone rubber TSE 2323)
(6) Dicumyl peroxide (made by Nippon Oils And Fats Co., Ltd.: Perk Mill D (F))
(7) Ladder type silicone (made by Showa Denko K.K.: GR 650)
(8) Carbon fiber (made by Toray Industries Inc.: MLD-100, fiber length 0.1 mm)
(9) Ethylene tetrafluoride resin (made by Mitsui-DuPont Fluorochemical Co.: Teflon 7J)

EXAMPLE 1

TSE 3402A (material 2) as the chief material was dissolved in a 1:2 mixed solvent of acetone and benzene at a concentration of 50%. The solution was added to Ultem 1000 (material 1) pulverized to pass a 60 mesh sieve so that the silicone content of the mixture will be 15%. Similarly, TSE 3402B (material 2) was dissolved in acetone at a concentration of 60% and the solution was added to Ultem 1000 pulverized to pass a 60 mesh sieve so that the silicone content will be 2.5 %. These mixtures were mixed by means of a Henschel mixer. After vaporization of the solvent, these two kinds of mixed powders were separately fed to a 2-axis melting machine, with which they were kneaded at 300° C. and at a screw speed of 100 rpm to form two kinds of pellets. Then, these pellets were mixed at a ratio of 3:2 (former:-latter) so as to have a final composition adjusted to Ultem/TSE 3402=90:10. The resultant pellets were injection molded at a resin temperature of 355° C., an injection pressure of 1,350 kg/cm$^2$ and a mold temperature of 140° C. to obtain ring-shaped test pieces 23 mm in outer diameter, 14 mm in inner diameter and 13 mm long, plate-shaped test pieces of 12.7 mm×63 mm×3 mm and dumbbel-shaped test pieces of ASTM-D638 type IV. The ring-shaped test pieces were tested for bending strength (kg/cm$^2$) and bending modulus of elasticity (kg/cm$^2$) by the test method under ASTM-D790. As to the plate-shaped test pieces, notched Izod impact strength (kg.cm/cm) was measured according to ASTM-D526. With the dumbbell-shaped test pieces, tensile strength (kg/cm$^2$) and modulus in tension (kg/cm$^2$) were measured according to ASTM-D638. The ring-shaped test pieces were further subjected to rubbing and abrasion tests. The rubbing coefficient was measured by use of a thrust type rubbing tester at a slide speed of 100 meters per minute and a load of 1.0 kg/cm$^2$. The abrasion coefficient ($\times 10^{-10}$cm$^3$/kg.m) was measured by use of a thrust type abrasion tester at a slide speed of 128 meters per minute and at a load of 1.6 kg/cm$^2$. Both tests were made by use of a mating part of bearing steel SUJ-2 (hardened and finished by grinding). After the abrasion test, the mating parts were checked for damage incurred by rubbing in terms of their surface roughness. The results are as shown in the table below. In the table, o and x marks are used if the mating part is not damaged and if damaged, respectively.

EXAMPLE 2

Molded test pieces were obtained in the same manner as in Example 1 except that the amount of TSE 3402 (material 2) added was 25%. With these test pieces, the same tests were made as in Example 1. The results are shown in the Table.

EXAMPLE 3

Molded test pieces were obtained in the same manner as in Example 1 except that the amount of TSE 3402 added was 40%. With these test pieces, the same tests were made as in Example 1.

EXAMPLE 4

Molded test pieces were obtained in the same manner as in Example 1 except that TSE 3562A and 3562B (material 3) were used instead of TSE 3402A and 3402B. The molded test pieces were left standing in the room for one full day for sufficient condensation. With these test pieces, the same tests were made as in Example 1.

EXAMPLE 5

Molded test pieces were obtained in the same manner as in Example 1 except that TUV 6000 (material 4) was dissolved in n-hexane at a concentration of 40% and the solution was added to Ultem 1000 pulverized to pass a 60 mesh sieve so that the silicone content will be 10%. These molded test pieces were exposed uniformly to ultra-violet rays from a 400W mercury lamp for photochemistry for 3 hours. With these test pieces, the same tests were made as in Example 1.

EXAMPLE 6

Molded test pieces were obtained in the same manner as in Example 1 except that 10% of TSE 2323 (material 5) and 0.1% of dicumyl peroxide (material 6) were added to Ultem 1000 pulverized to pass a 60 mesh sieve and mixed with a Henschel mixer. With these test pieces, the same tests were made as in Example 1.

CONTROL EXAMPLE 1

Molded test pieces were obtained in the same manner as in Example 1 except that none was added to Ultem 1000. For them, the same tests as in Example 1 were made.

CONTROL EXAMPLE 2

Molded test pieces were obtained in the same manner as in Example 1 except that the amount of TSE 3402 added was increased to 60%. For them, the same tests as in Example 1 were made.

CONTROL EXAMPLE 3

Molded test pieces were obtained in the same manner as in Example 1 except that ladder-type silicone (material 7) was dissolved in acetone at a concentration of 60%. The mixture was added to Ultem 1000 so that the silicone content will be 10%. The same tests as in Example 1 were made for them.

CONTROL EXAMPLE 4

Molded test pieces were obtained in the same manner as in Example 1 except that 30% of carbon fiber (material 8) and 15% of ethylene tetrafluodide resin (material 9) were added to Ultem 1000 and mixed in a Henschel mixer. The same tests as in Example 1 were made for them.

From the tabulated data it is apparent that the test pieces obtained in Control Examples are unsatisfactory because the impact strength is poor and the mating part is damaged (Control Example 1), because rigidity is markedly impaired although the impact strength is high and the mating part is not damaged (Control Example 2), because neither impact strength nor damage to the mating part is improved although rigidity is high (Control Example 3) or because the mating part is damaged although the sliding characteristic is partly improved by addition of a solid lubricant (Control Example 4). Thus, none of the Control Examples show satisfactory characteristics. In contrast thereto, the test pieces obtained in Examples 1-6 are excellent in impact strength without markedly sacrificing rigidity and causing damage to the mating part.

| Test item | Examples | | | | | | Control examples | | | |
|---|---|---|---|---|---|---|---|---|---|---|
| | 1 | 2 | 3 | 4 | 5 | 6 | 1 | 2 | 3 | 4 |
| Izod impact strength | 7 | 11 | 13 | 6 | 7 | 6 | 2 | 22 | 3 | 4 |
| Tensile strength | 840 | 760 | 700 | 580 | 960 | 860 | 1010 | 445 | 800 | 1400 |
| Modulus in tention | 31000 | 28000 | 26000 | 26000 | 32000 | 29000 | 30600 | 16400 | 30000 | 50500 |
| Bending strength | 1200 | 1100 | 990 | 1000 | 1210 | 1060 | 1480 | 636 | 1340 | 1840 |
| Bending modulus of elasticity | 26400 | 2380 | 22000 | 25300 | 28000 | 25100 | 33700 | 13900 | 30990 | 115000 |
| Rubbing coefficient | 0.41 | 0.33 | 0.38 | 0.36 | 0.39 | 0.34 | 0.63 | 0.44 | 0.40 | 0.36 |
| Abrasion coefficient | 22000 | 3800 | 2200 | 2000 | 20000 | 2000 | 23000 | 2300 | 2000 | 1800 |
| Damage on mating part | o | o | o | o | o | o | x | o | x | x |

What are claimed are:

1. A polyether imide resin composition comprising 50 to 0.5 percent by weight of a vulcanizable organopolysiloxane elastomer added to 50 to 99.5 percent by weight of a polyether imide which is a thermoplastic polymer having ether bonds and imide bonds.

2. The polyether imide resin composition as claimed in claim 1, wherein said vulcanizable organopolysiloxane elastomer has a linear organopolysiloxane block represented by the chemical formula:

$$-(-R_2SiO-)-n$$

wherein R is selected from; a monovalent organic group of the same or different kinds, and hydrogen, provided that at least one R must be a monovalent organic group.

3. The polyether imide resin composition of claim 1 wherein the organopolysiloxane elastomer is vulcanized in the polyether imide.

4. The polyether imide resin composition of claim 1 further comprising a catalyst for vulcanization.

5. The polyether imide resin composition of claim 1 further comprising an organic peroxide.

* * * * *